Feb. 11, 1941.    H. L. BROWN    2,231,796
QUICK CHANGE LOCKING DEVICE
Filed Nov. 16, 1939    2 Sheets-Sheet 1
Fig. 1.
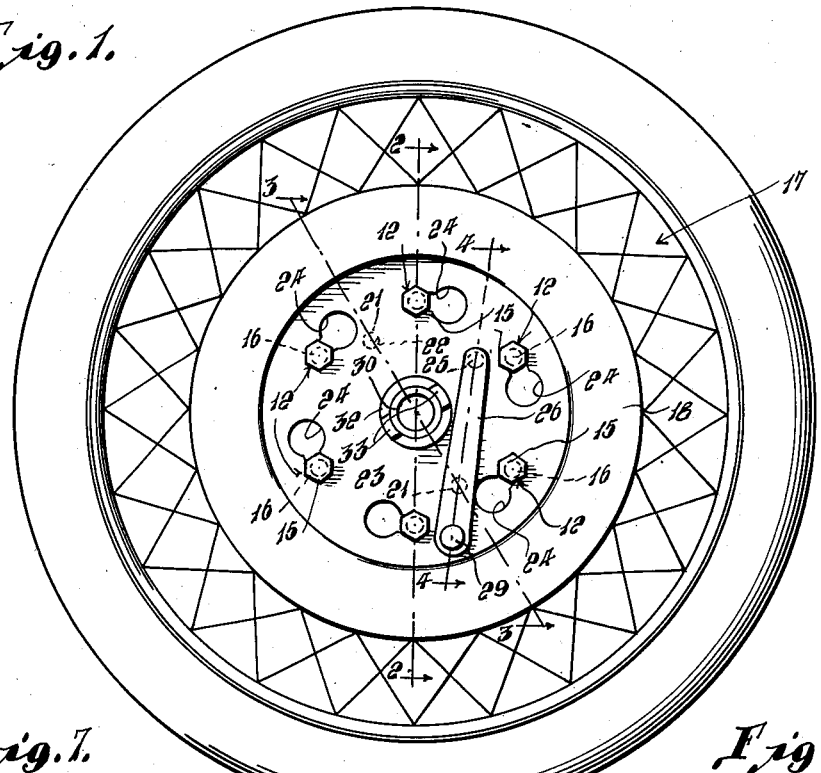
Fig. 7.
Fig. 8.
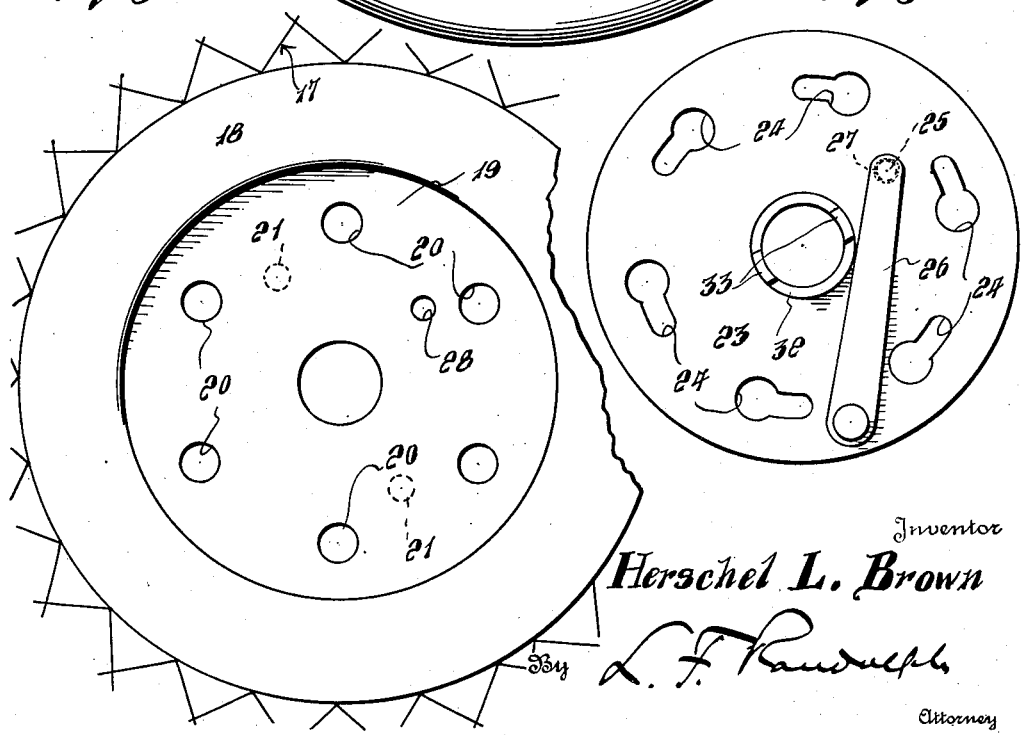
Inventor
Herschel L. Brown
By L. F. Randulph
Attorney Feb. 11, 1941. H. L. BROWN 2,231,796
QUICK CHANGE LOCKING DEVICE
Filed Nov. 16, 1939 2 Sheets-Sheet 2
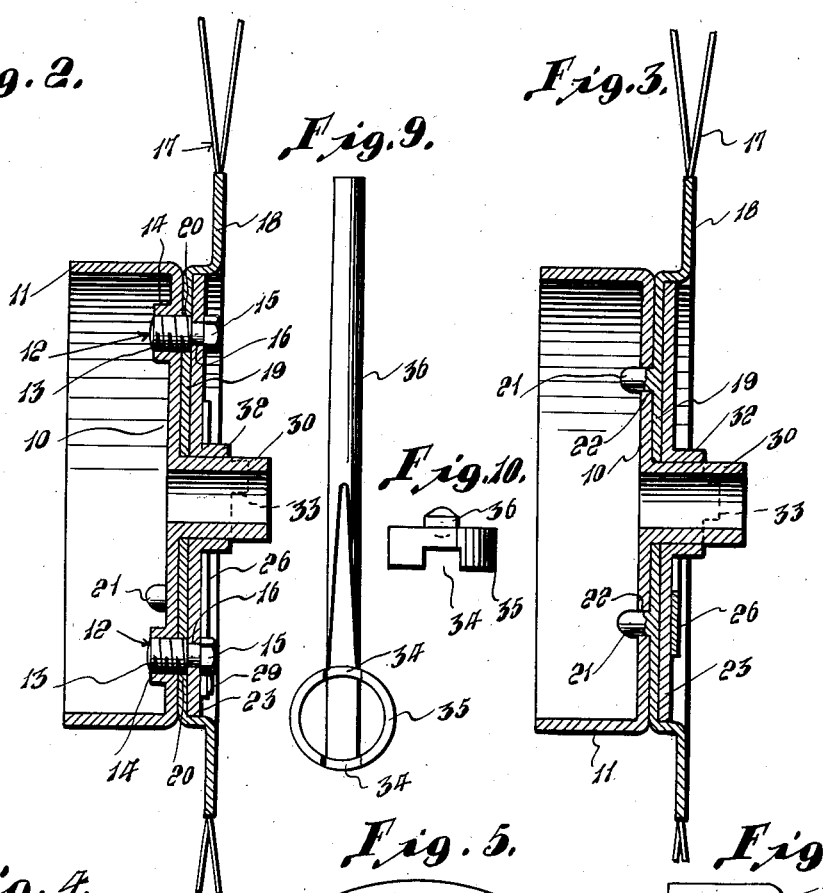
Inventor
Herschel L. Brown Patented Feb. 11, 1941

2,231,796

UNITED STATES PATENT OFFICE 2,231,796

QUICK CHANGE LOCKING DEVICE

Herschel L. Brown, Bazine, Kans.

Application November 16, 1939, Serial No. 304,873

2 Claims. (Cl. 301—9)

This invention relates to a quick change locking device or assembly.

It is particularly aimed to provide such a device having a co-acting hub, locking plate and article to be locked therebetween, of a construction avoiding the necessity of removing a plurality of nuts or the like and consequently replacing them.

The invention may be used in various devices, for instance automobile wheels, sprockets, caps, emery wheels, lathe chucks, line shafts, automobiles, trucks, trailers, tractors, aeroplanes, farm and commercial machinery and otherwise.

I preferably employ in connection with the structure, fastening studs in combination with bayonet slots, and a novel latch, and a novel wrench engaging means for turning the lock plate.

The more specific objects and advantages will become apparent from a consideration of the description following taken in connection with accompanying drawings illustrating an operative embodiment.

In said drawings:

Figure 1 is a view in elevation of an automobile wheel and associated parts embodying my improvements;

Figure 2 is a vertical section taken on the line 2—2 of Figure 1;

Figure 3 is a section taken on the line 3—3 of Figure 1;

Figure 4 is a section taken on the line 4—4 of Figure 1;

Figure 5 is a front elevation of the hub;

Figure 6 is a side elevation of said hub;

Figure 7 is an enlarged elevation of the central disk portion of the wheel;

Figure 8 is a front elevation of the locking plate;

Figure 9 is a plan view of a wrench which may be used to turn the locking plate, and Figure 10 is an end elevation of said wrench.

Referring specifically to the drawings wherein like reference characters designate like or similar parts, 10 designates a hub having an annular band 11. A plurality of equidistantly spaced studs 12 are carried by said hub, preferably having attaching portions 13 adjustably screw threaded in bosses 14 of the hub. Such studs also have heads at 15, which may be hexagonal or of any other desired shape. Between the attaching portions 13 and heads 15, said studs have reduced necks 16.

A wheel 17 represents a conventional article which may be fastened in place by means of my invention, the same having a central disk 18 with a depressed portion 19. Said depressed portion 19 has a plurality of holes 20 therethrough registering with and fitting over the heads 15, whereby portion 19 surrounds the stud portions 13 and contacts the hub.

On the back of the depressed portion 19 of the wheel disk, one or more centering pins 21 are provided which register with and enter holes 22 provided in the hub 10.

A locking plate 23 is adapted to occupy the recess of the portion 19 and the same has a plurality of equidistantly spaced keyhole slots 24 whose larger portions receive the heads 15 and whose smaller portions, through slight turning, engage the necks 16 and are overlapped by the heads 15. When the necks 16 are engaged by the smaller portions of the slots 24, a lug or stud 25 on a spring latch 26, is adapted to be projected through an opening or hole 27 in the locking plate and a hole 28 in the disk portion 19, thus holding the locking plate against rotation. The spring latch 26 is fastened as by means of a rivet 29 to the locking plate 23.

The hub 10 may have a central hollow hub portion 30 and the portion 19 has a central opening which fits such portion 30. In addition, the locking plate has a collar 32 which surrounds the portion 30 and at its outer end has a pair of lugs 33, or is otherwise irregular, so that the same may be engaged in notches 34 of an annular wrench head 35, carried by a lever or handle 36.

As a result of the construction described, the article to be fastened namely 19, may be very rapidly applied or removed following disengagement of the lug 25 of the latch 26 since the latter is resilient and may swing laterally on its pivot 29. Through the medium of the wrench head 35, the locking plate may be readily and rapidly turned, to aline the larger portions of the slots 24 with the studs for removal of the locking plate and then removal of the wheel. Since the studs are screw threaded at 13 to the hub, they may be engaged if desired by a wrench or tool to tighten the heads 15 against the locking plate whenever desired or they may be left at such adjustment, that there is no binding between the heads 15 and the locking plate, so that at all times, when the latch 26 is disengaged, the locking plate may be turned to apply or remove the wheel.

Various changes may be resorted to provided they fall within the spirit and scope of the invention.

I claim as my invention:

1. In combination, a hub member, studs thereon having body portions, heads and necks extending beyond the hub member, said necks being reduced to provide grooves around the same, an article to be fastened to the hub of the same thickness as the extension of the body portions beyond the hub having openings through which the heads and necks project, a locking plate, said locking plate having keyhole slots whose larger portions are passable over the heads for turning so that their smaller portions will engage the necks and adjacent portions of the plate will occupy the grooves, interfitting means between the article and hub, an outwardly extending irregular collar on the locking plate for engagement by a wrench or the like, and a tubular hub portion on the hub member within the collar and extending outwardly as far as the collar, whereby the irregular portion of the collar is protected against mutilation.

2. In combination, a hub member, studs thereon having body portions, heads and necks, extending beyond the hub member, said necks being reduced to provide grooves around the same, an article to be fastened to the hub of the same thickness as the extension of the body portions beyond the hub having openings through which the heads and necks project, a locking plate, said locking plate having key-hole slots whose larger portions are passable over the heads for turning so that their smaller portions will engage the necks and adjacent portions of the plate will occupy the grooves, interfitting means between the article and hub, latching means between the locking plate and article carried by the locking plate, said body portions being screw threaded to the hub for adjustment according to the thickness of the locking plate and their heads being shaped for engagement by adjusting means, an outwardly extending irregular collar on the locking plate for engagement by a wrench or the like, and a tubular hub portion on the hub member within the collar and extending outwardly as far as the collar, whereby the irregular portion of the collar is protected against mutilation.

HERSCHEL L. BROWN.